(12) United States Patent
Kulandai Samy et al.

(10) Patent No.: US 12,405,582 B2
(45) Date of Patent: Sep. 2, 2025

(54) PREDICTIVE MODELING AND CONTROL SYSTEM FOR BUILDING EQUIPMENT WITH MULTI-DEVICE PREDICTIVE MODEL GENERATION

(71) Applicant: Tyco Fire & Security GmbH, Neuhausen am Rheinfall (CH)

(72) Inventors: Santle Camilus Kulandai Samy, Sunnyvale, CA (US); Michael J. Risbeck, Madison, WI (US); Young M. Lee, Old Westbury, NY (US); Chenlu Zhang, Milwaukee, WI (US); Zhanhong Jiang, Milwaukee, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 691 days.

(21) Appl. No.: 17/710,443

(22) Filed: Mar. 31, 2022

(65) Prior Publication Data
US 2023/0315031 A1  Oct. 5, 2023

(51) Int. Cl.
*G05B 13/04* (2006.01)
*G05B 13/02* (2006.01)

(52) U.S. Cl.
CPC ......... *G05B 13/048* (2013.01); *G05B 13/027* (2013.01)

(58) Field of Classification Search
CPC .. G05B 13/048; G05B 13/027; G06F 11/0709
See application file for complete search history.

(56) References Cited

U.S. PATENT DOCUMENTS

| | | |
|---|---|---|
| 9,447,985 B2 | 9/2016 | Johnson |
| 10,871,756 B2 | 12/2020 | Johnson et al. |
| 10,908,578 B2 | 2/2021 | Johnson et al. |
| 10,921,768 B2 | 2/2021 | Johnson et al. |
| 11,156,978 B2 | 10/2021 | Johnson et al. |
| 2003/0055798 A1 | 3/2003 | Hittle et al. |
| 2009/0083583 A1 | 3/2009 | Seem et al. |

(Continued)

FOREIGN PATENT DOCUMENTS

| | | |
|---|---|---|
| CA | 2957726 A1 | 3/2016 |
| CA | 3043996 A1 | 2/2018 |

(Continued)

OTHER PUBLICATIONS

Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

(Continued)

*Primary Examiner* — Schyler S Sanks
(74) *Attorney, Agent, or Firm* — Foley & Lardner LLP

(57) ABSTRACT

A system includes a plurality of devices of building equipment, an additional device of building equipment, and a computing system. The computing system is configured to process data from the plurality of devices to extract common features of the plurality of devices, train a global model based on the common features, obtain additional data from the additional device, adapt the global model for the additional device based on the additional data to obtain an adapted model for the additional device, predict a status of the additional device using the adapted model, and affect an operation of the additional device based on the status.

20 Claims, 15 Drawing Sheets

(56) References Cited

U.S. PATENT DOCUMENTS

| | | | |
|---|---|---|---|
| 2011/0178977 A1 | 7/2011 | Drees | |
| 2014/0222394 A1 | 8/2014 | Drees et al. | |
| 2014/0316743 A1 | 10/2014 | Drees et al. | |
| 2015/0227870 A1 | 8/2015 | Noboa et al. | |
| 2016/0169572 A1 | 6/2016 | Noboa et al. | |
| 2016/0370258 A1 | 12/2016 | Perez | |
| 2017/0276571 A1 | 9/2017 | Vitullo et al. | |
| 2018/0087790 A1 | 3/2018 | Perez | |
| 2018/0187909 A1 | 7/2018 | Drees et al. | |
| 2018/0373234 A1 | 12/2018 | Khalate et al. | |
| 2019/0034309 A1 | 1/2019 | Nayak et al. | |
| 2019/0146431 A1 | 5/2019 | Nayak et al. | |
| 2019/0302709 A1 | 10/2019 | Vitullo | |
| 2019/0346817 A1 | 11/2019 | Perez | |
| 2019/0385070 A1* | 12/2019 | Lee | F24F 11/64 |
| 2020/0072373 A1 | 3/2020 | Noboa et al. | |
| 2020/0233391 A1 | 7/2020 | Ma et al. | |
| 2020/0241051 A1 | 7/2020 | Sridharan et al. | |
| 2020/0326666 A1 | 10/2020 | Salsbury et al. | |
| 2021/0010702 A1 | 1/2021 | Hjortland | |
| 2021/0190354 A1 | 6/2021 | Llopis et al. | |
| 2021/0191378 A1 | 6/2021 | Amores et al. | |
| 2021/0191379 A1 | 6/2021 | Llopis et al. | |
| 2021/0223768 A1 | 7/2021 | Khalate et al. | |
| 2021/0223769 A1 | 7/2021 | Khalate et al. | |
| 2021/0262689 A1 | 8/2021 | Shinde et al. | |
| 2021/0271996 A1 | 9/2021 | Horgan et al. | |
| 2021/0312351 A1 | 10/2021 | Pourmohammad et al. | |
| 2021/0341165 A1 | 11/2021 | Pierson et al. | |
| 2022/0034543 A1 | 2/2022 | Alanqar et al. | |
| 2022/0035357 A1 | 2/2022 | Elbsat et al. | |

FOREIGN PATENT DOCUMENTS

| | | |
|---|---|---|
| EP | 1 156 286 A2 | 11/2001 |
| EP | 3 186 687 A4 | 7/2017 |
| EP | 3 497 377 A1 | 6/2019 |
| WO | WO-2012/161804 A1 | 11/2012 |
| WO | WO-2013/130956 A1 | 9/2013 |

OTHER PUBLICATIONS

Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).

Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).

Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).

Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).

Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).

Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).

Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).

Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).

Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).

Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).

Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).

Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).

Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).

Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).

Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).

Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).

Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).

Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).

Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).

Johnson Solid State LLC, "Cooling Logic Overview," URL: http://coolinglogic.com/documents/CoolingLogic_Overview_High_Quality.mp4, retrieved from internet Oct. 27, 2022 (16 pages).

Johnson Solid State LLC, "So what is CoolingLogic™?" URL: http://coolinglogic.com/Coolinglogic-How-it-Works.html, retrieved from the internet Oct. 27, 2022 (3 pages).

Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).

Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).

(56) References Cited

OTHER PUBLICATIONS

Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).
Liang et al., "Partial Domain Adaption Based Prediction Calibration Methodology for Fault Detection and Diagnosis of Chillers Under Variable Operational Condition Variables," Building and Environment, Jun. 2022, vol. 217 (21 pages).
Yan et al., "Chiller Faults Detection and Diagnosis with Sensor Network and Adaptive 1D CNN," Digital Communications and Networks, 2022, 8 (pp. 531-539).
Yan et al., "Deep Learning Technology for Chiller Faults Diagnosis," 2019 IEEE International Conference on Dependable, Autonomic and Secure Computing, International Conference on Pervasive Intelligence and Computing, International Conference on Cloud and Big Data Computing, International Conference on Cyber Science and Technology Congress (DASC/PiCom/CBDCom/CyberSciTech), Fukuoka, Japan, 2019 (pages).
Yan et al., "Generative Adversarial Network for Fault Detection Diagnosis of Chillers," Building and Environment, Apr. 2020, vol. 172 (19 pages).
Yan, K., "Chiller Fault Detection and Diagnosis with Anomaly Detective Generative Adversarial Network," Building and Environment, May 2021, vol. 201 (12 pages).
Zhu et al., "Transfer Learning Based Methodology for Migration and Application of Fault Detection and Diagnosis Between Building Chillers for Improving Energy Efficiency," Building and Environment, Aug. 2021, vol. 200 (16 pages).
U.S. Appl. No. 17/523,567, filed Nov. 10, 2021.
U.S. Appl. No. 17/540,725, filed Dec. 2, 2021.
U.S. Appl. No. 17/665,987, filed Feb. 7, 2022.
U.S. Appl. No. 17/710,443, filed Mar. 31, 2022, Johnson Controls Tyco IP Holdings LLP.
U.S. Appl. No. 17/710,597, filed Mar. 31, 2022, Johnson Controls Tyco IP Holdings LLP.
U.S. Appl. No. 17/710,706, filed Mar. 31, 2022, Johnson Controls Tyco IP Holdings LLP.
Afram et al., "Theory and Application of HVAC Control Systems—A review of Model Predictive Control (MPC)," Building and Environment, Feb. 2014, vol. 72 (pp. 343-355).
Ahn et al., "Optimal Control Development for Chilled Water Plants Using a Quadratic Representation," Energy and Buildings, Apr. 2001, vol. 33, No. 4 (pp. 371-378).
Burer et al., "Non-convex Mixed-Integer Nonlinear Programming: A Survey," Surveys in Operations Research and Management Science, Jul. 2012, vol. 17, No. 2 (pp. 97-106).
Cantoni, A., "Optimal Curve Fitting with Piecewise Linear Functions," IEEE Transactions on Computers, Jan. 1971, vol. 20, No. (pp. 59-67).
Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).
Drgona et al., "All you Need to Know about Model Predictive Control for Buildings," Annual Reviews in Control, 2020, vol. 50 (pp. 190-232).
EPO Notice of Opposition to a European Patent issued in Appl. Ser. No. EP 16165681.4 dated May 2, 2023 (48 pages).
EPO Notice of Opposition to a European Patent issued in Appl. Ser. No. EP 16165681.4 dated May 2, 2023 (51 pages).
EPO Notice of Opposition to a European Patent with Consolidated List issued in EP Appl. Ser. No. 16165681.4 dated May 2, 2023 (4 pages).
EPO Office Action on EP Appl. Ser. No. 16165681.4 dated Apr. 6, 2021 (7 pages).
Extended European Search Report on EP Appl. Ser. No. 16165681.4 dated Oct. 20, 2016 (5 pages).
Extended European Search Report on EP Appl. Ser. No. 22177772.5 dated Sep. 26, 2022 (11 pages).
Hackner, J.R., "Hvac system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
McKenna et al., "A TRNSYS model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildings," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).

(56) References Cited

OTHER PUBLICATIONS

Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition- Coordination Method," Energy and Buildings, May 2010, vol. 42, No. 5 (pp. 570-583).

\* cited by examiner

```
1700                                          1702
Training data:                                Training data:
- 2948 executions.                            - 24265 executions.
  - 701 executions with faults.                 - 4720 executions with faults.

Testing data:                                 Testing data:
- 2531 executions.                            - 2531 executions.
  - 249 executions with faults.                 - 249 executions with faults.

- Shutdown Prediction- 24 hour prior:         - Shutdown Prediction- 24 hour prior:
  - True Negative    : 64                       - True Negative    : 2283
  - True Positive    : 229                      - True Positive    : 218
  - False Negative   : 8                        - False Negative   : 19
  - False Positive   : 2230                     - False Positive   : 11
  - Auc              : 0.533                    - Auc              : 0.974
  - Accuracy         : 0.116                    - Accuracy         : 0.988
  - Precision        : 0.093                    - Precision        : 0.952
  - Recall           : 0.966                    - Recall           : 0.920
  - F1               : 0.170                    - F1               : 0.936
- Shutdown Prediction- (24-48) hour prior:    - Shutdown Prediction- (24-48) hour prior:
  - True Negative    : 82                       - True Negative    : 2279
  - True Positive    : 220                      - True Positive    : 207
  - False Negative   : 8                        - False Negative   : 21
  - False Positive   : 2221                     - False Positive   : 24
  - Auc              : 0.542                    - Auc              : 0.964
  - Accuracy         : 0.119                    - Accuracy         : 0.982
  - Precision        : 0.090                    - Precision        : 0.896
  - Recall           : 0.965                    - Recall           : 0.908
  - F1               : 0.165                    - F1               : 0.902
```

FIG. 17

PREDICTIVE MODELING AND CONTROL SYSTEM FOR BUILDING EQUIPMENT WITH MULTI-DEVICE PREDICTIVE MODEL GENERATION

BACKGROUND

The present disclosure relates generally to building management systems. The present disclosure relates more particularly to fault detection for connected equipment in a building management system. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Systems and devices in a BMS often generate temporal or time-series data that can be analyzed to determine the performance of the BMS and the various components thereof and/or predict future events such as faults, errors, malfunctions, etc. of the building equipment. For example, data can be examined and alert a user to repair the fault before it becomes more severe when the monitored system or process begins to degrade in performance, or to provide other advantageous technical benefits. However, many fault detection or prediction approaches are dependent on pre-existence of a robust set of historical data with multiple instances of different types of fault events. Such robust data is often not available in practice.

SUMMARY

One implementation of the present disclosure is as system. The system includes a first device of building equipment, a plurality of additional devices of building equipment, and a computing system. The computing system is programmed to assess whether a data set from the first device is sufficient to train a fault prediction model for the first device, train the fault prediction model for the first device using the data set from the first device in response to a determination that the data set from the first device is sufficient to train the fault prediction model for the first device, and augment the data set with supplemental data from one or more of the plurality of additional devices to obtain an augmented data set and train the fault prediction model for the first device using the augmented data set in response to a determination that the data set from the first device is insufficient to train the fault prediction model for the first device. The computing system is also configured to influence operations of the first device using the fault prediction model.

In some embodiments, the computing system is programmed to augment the data set with the supplemental data from the one or more of the plurality of additional devices by increasing an amount of the supplemental data until the augmented data set is sufficient to train the fault prediction model. In some embodiments, the computing system is programmed to augment the data set with the supplemental data from the one or more of the plurality of additional devices by increasing a count of the one or more of the plurality of additional devices from which supplemental data is used until the augmented data set is sufficient to train the fault prediction model.

In some embodiments, the supplemental data is specific to a particular type of fault and the fault prediction model predicts the particular type of fault. In some embodiments, the fault prediction model is per device and the computing system is further programmed to train a plurality of per fault type models configured to predict a plurality of different types of faults. In some embodiments, the computing system is programmed to augment the data set with the supplemental data from the one or more of the plurality of additional devices by clustering the plurality of additional devices in a plurality of clusters based on characteristics of the plurality of additional devices. associating the first device with a first cluster of the plurality of cluster, and extracting the supplemental data from the first cluster.

Another implementation of the present disclosure is a system. The system includes a plurality of devices of building equipment, an additional device of building equipment, and a computing system. The computing system is configured to process data from the plurality of devices to extract common features of the plurality of devices, train a global model based on the common features, obtain additional data from the additional device, adapt the global model for the additional device based on the additional data to obtain an adapted model for the additional device, predict a status of the additional device using the adapted model, and affect an operation of the additional device based on the status.

In some embodiments, the computing system is configured to remove features other than the common features. The common features can include a latent feature from a neural network. In some embodiments, the common features include a reduced feature from a principle component analysis. In some embodiments, the global model includes a plurality of fault-type-specific models configured to predict faults of different types.

Another implementation of the present disclosure is a method. The method includes grouping a plurality of devices in a plurality of clusters based on characteristics of the devices, obtaining information relating to an additional device, automatically matching the additional device to a first cluster of the plurality of clusters based on a characteristic of the additional device, training a predictive model for the additional device using training data corresponding to the devices in the first cluster, and using the predictive model to affect an operation of the additional device.

In some embodiments, the method may include applying a standardization or normalization to the training data. The method also may include selecting the training data by identifying occurrences of a desired set of fault types for the devices in the first cluster. In some embodiments, training the predictive model for the additional device using the training data corresponding to the devices in the first cluster includes training an initial model using the training data and adapting the initial model based on data specific to the additional device.

In some embodiments, the characteristics of the devices include equipment model types of the devices. The characteristics of the devices may include building types serviced by the devices. The method may include obtaining the training data by extracting common features from raw data for the devices in the first cluster. The common features can be latent features. In some embodiments, the predictive model includes a plurality of sub-models configured to predict a plurality of types of faults.

Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 17 is a depiction of experimental data showing improved performance resulting from the teachings here, according to some embodiments.

DETAILED DESCRIPTION

Following below are more detailed descriptions of various concepts related to, and implementations of systems, methods, and apparatuses for generating time varying performance indications for connected equipment in a building management system. Before turning to the more detailed descriptions and figures, which illustrate the exemplary embodiments in detail, it should be understood that the application is not limited to the details or methodology set forth in the descriptions or illustrated in the figures. It should also be understood that the terminology is for the purpose of description only and should not be regarded as limiting in any way.

Building HVAC Systems and Building Management Systems

Figure 1:
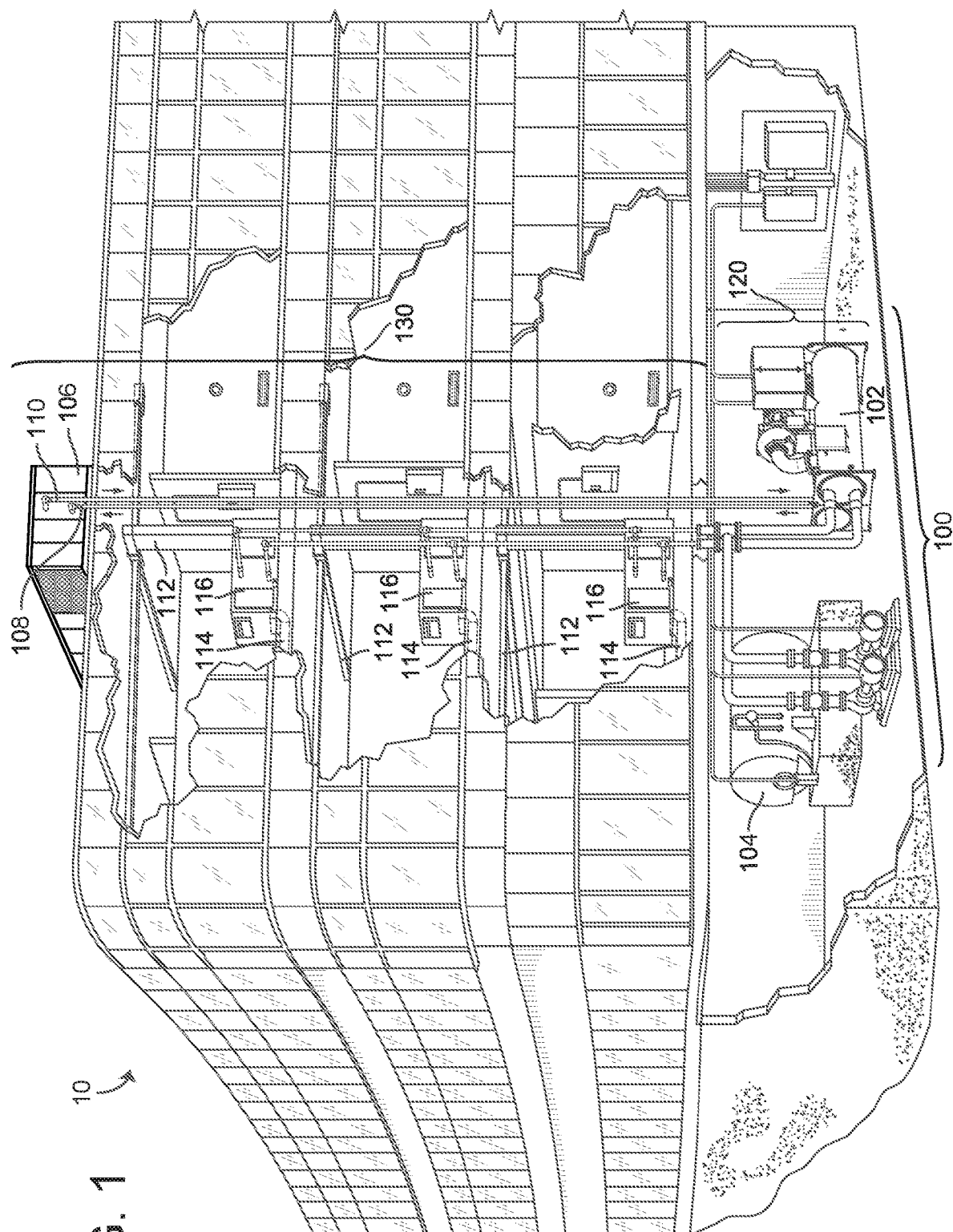
FIG. 1 is a drawing of a building equipped with a HVAC system, according to some embodiments.
Figure 2:
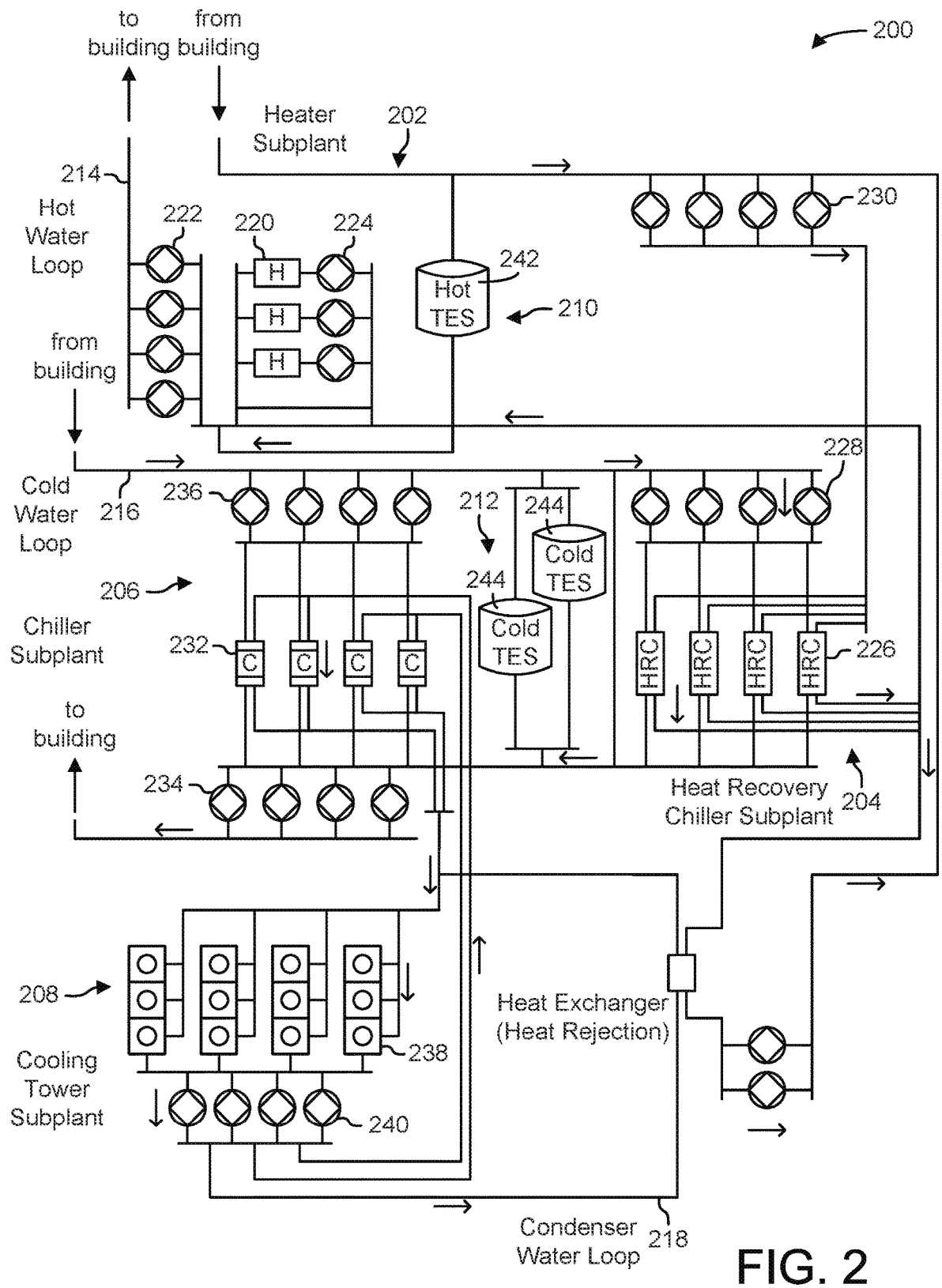
FIG. 2 is a schematic diagram of a waterside system which can be used in conjunction with the building of FIG. 1, according to some embodiments.
Figure 3:
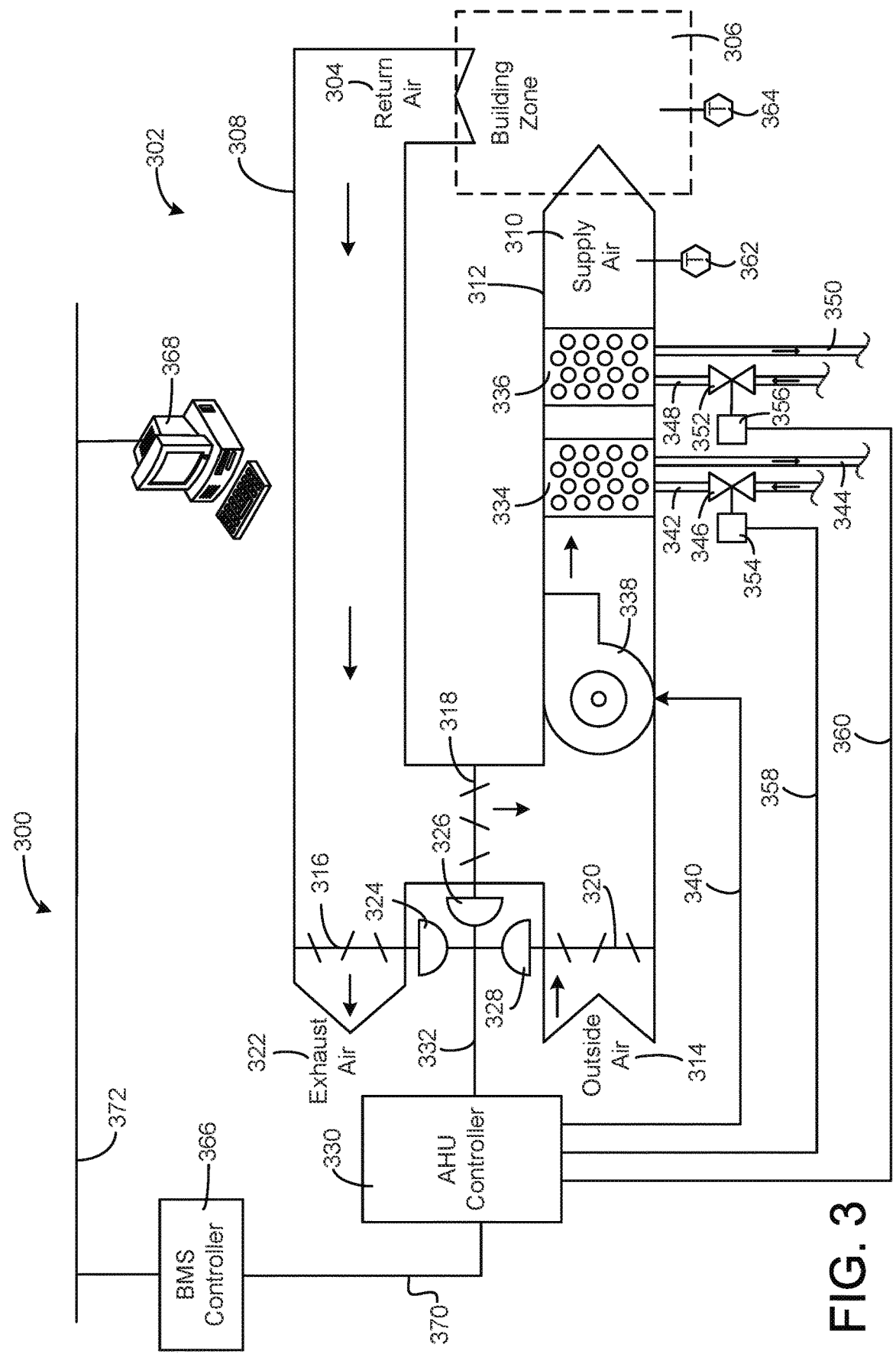
FIG. 3 is a schematic diagram of an airside system which can be used in conjunction with the building of FIG. 1, according to some embodiments.
Figure 4:
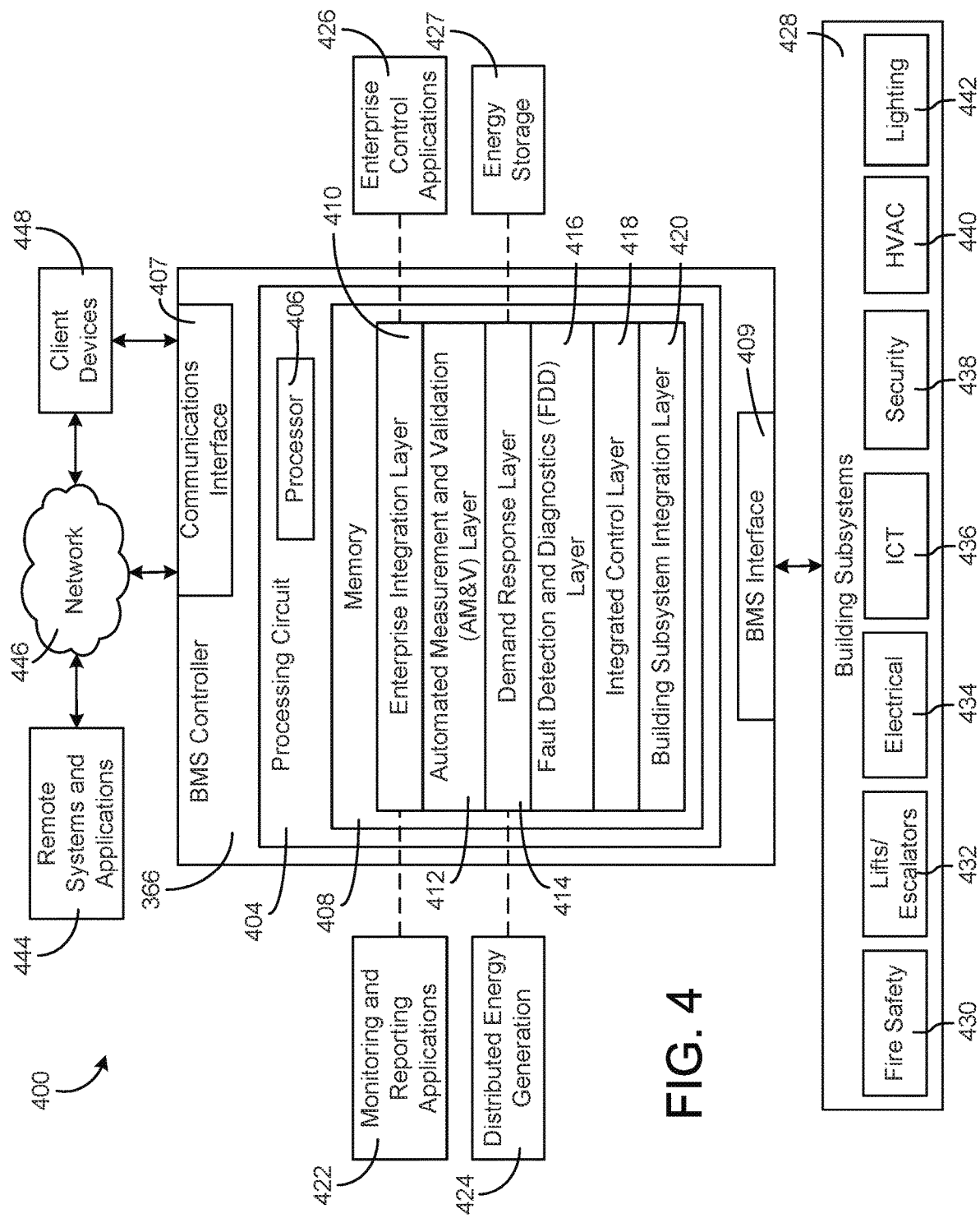
FIG. 4 is a block diagram of a building management system (BMS) which can be used to monitor and control the building of FIG. 1, according to some embodiments.
Figure 5:
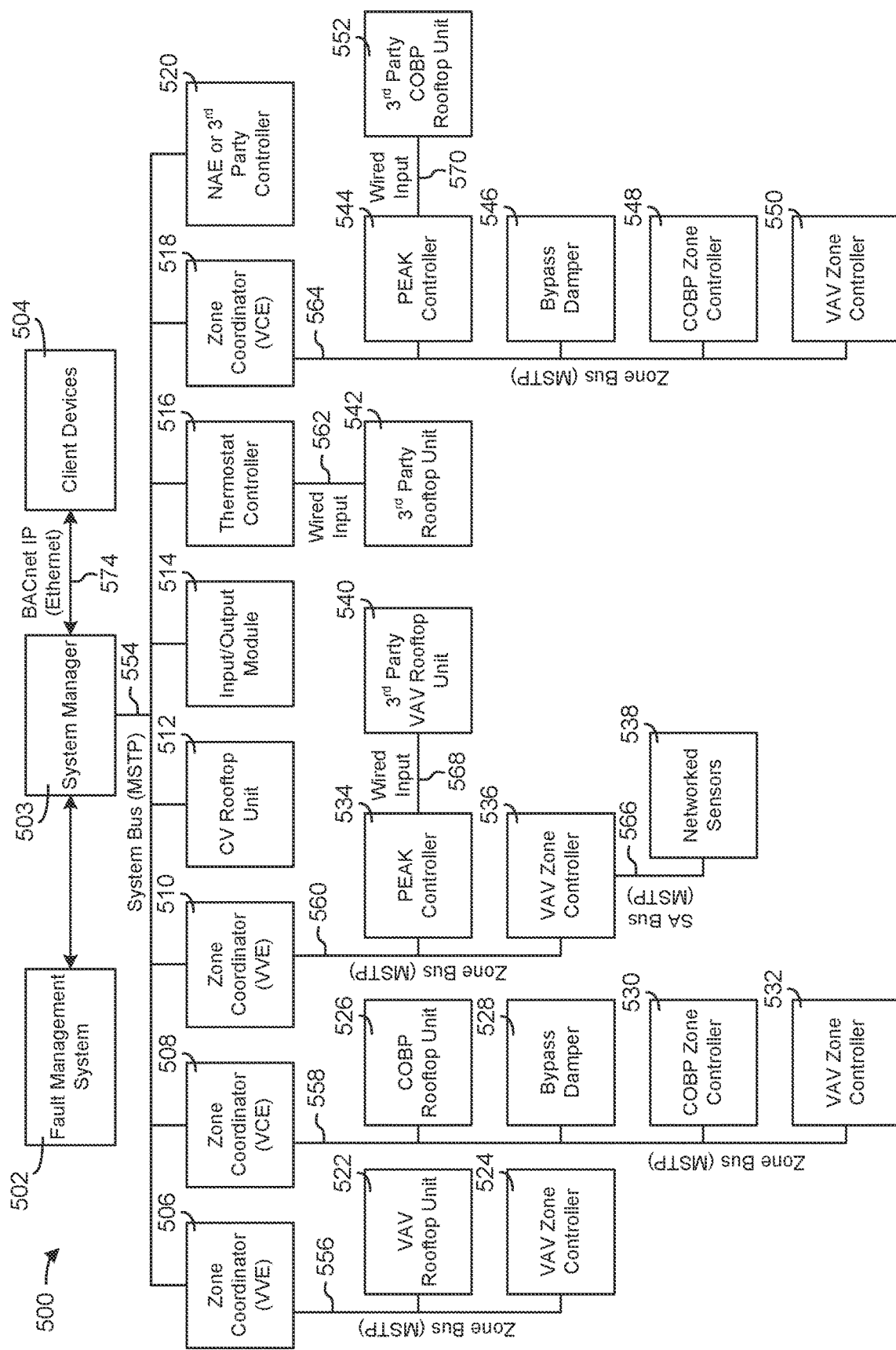
FIG. 5 is a block diagram of another BMS which can be used to monitor and control the building of FIG. 1 and includes a fault management system, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building 10 and HVAC System 100

Referring particularly to FIG. 1, a perspective view of building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2 and 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System 200

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System 300

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management System 400

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, thermostats, and other devices for controlling the temperature, humidity, airflow, or other variable conditions within building 10. Lighting subsystem 442 can include any number of light fixtures, ballasts, lighting sensors, dimmers, and/or other devices configured to controllably adjust the amount of light provided to a building space. Security subsystem 438 can include occupancy sensors, video surveillance cameras, digital video recorders, video processing servers, intrusion detection devices, access control devices and servers, and/or other security-related devices.

Still referring to FIG. 4, BMS controller 366 is shown to include a communications interface 407 and a BMS interface 409. Communications interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Communications interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Communications interfaces 407 and/or BMS interface 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via communications interfaces 407 and/or BMS interface 409 can be direct (e.g., local wired or wireless communications) or via a communications network 446 (e.g., a WAN, the Internet, a cellular network, etc.). For example, communications interfaces 407 and/or BMS interface 409 can include an Ethernet card and port for sending and receiving data via an Ethernet-based communications link or network. In another example, communications interfaces 407 and/or BMS interface 409 can include a Wi-Fi transceiver for communicating via a wireless communications network. In another example, one or both of communications interfaces 407 and BMS interface 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via communications interfaces 407 and/or BMS interface 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at communications interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs (e.g., internal to building 10, external to building 10, etc.) such as temperature, carbon dioxide levels, relative humidity levels, air quality sensor outputs, occupancy sensor outputs, room schedules, weather conditions, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints, etc.) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface, etc.) so that the control actions initiated in response to demand inputs can be tailored for the user's application, desired comfort level, particular building equipment, and/or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and/or when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, and/or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage, etc.) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System 500

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment. In some embodiments, the building management system includes a fault management system.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a fault management system 502; a system manager 503; several zone coordinators 506, 508, 510 and 518; and several zone controllers 524, 530, 532, 536, 548, and 550. System manager 503 can monitor various data points in BMS 500 and report monitored variables to fault management system 502. System manager 503 can communicate with client devices 504 (e.g., user devices, desktop computers, laptop computers, mobile devices, etc.) via a data communications link 574 (e.g., BACnet IP, Ethernet, wired or wireless communications, etc.). System manager 503 can provide a user interface to client devices 504 via data communications link 574. The user interface may allow users to monitor and/or control BMS 500 via client devices 504.

In some embodiments, system manager 503 is connected with zone coordinators 506-510 and 518 via a system bus 554. System manager 503 can be configured to communicate with zone coordinators 506-510 and 518 via system bus 554 using a master-slave token passing (MSTP) protocol or any other communications protocol. System bus 554 can also connect system manager 503 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 503 and can be connected directly to system bus 554. Other RTUs can communicate with system manager 503 via an intermediate device. For example, a wired input 562 can connect a third-party RTU 542 to thermostat controller 516, which connects to system bus 554.

System manager 503 can provide a user interface for any device containing an equipment model. Devices such as zone coordinators 506-510 and 518 and thermostat controller 516 can provide their equipment models to system manager 503 via system bus 554. In some embodiments, system manager 503 automatically creates equipment models for connected devices that do not contain an equipment model (e.g., IOM 514, third party controller 520, etc.). For example, system manager 503 can create an equipment model for any device that responds to a device tree request. The equipment models created by system manager 503 can be stored within system manager 503. System manager 503 can then provide a user interface for devices that do not contain their own equipment models using the equipment models created by system manager 503. In some embodiments, system manager 503 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Fault Management System for Connected Equipment

Figure 6:
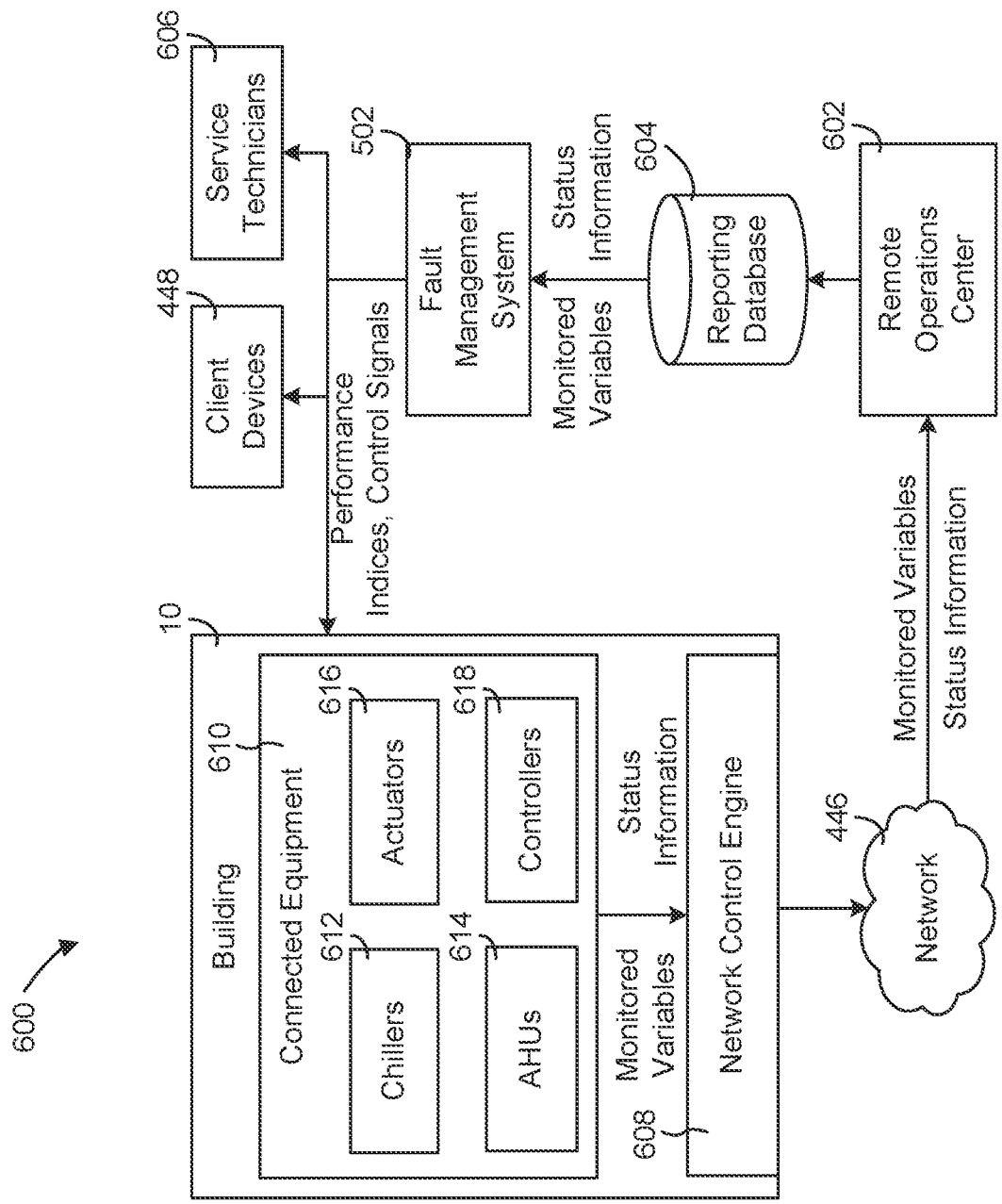
FIG. 6 is a block diagram of another BMS including the fault management system, according to some embodiments.

Referring now to FIG. 6, a block diagram of another building management system (BMS) 600 which includes a fault management system for connected equipment is shown, according to some embodiments. BMS 600 can include many of the same components as BMS 400 and BMS 500 as described with reference to FIGS. 4 and 5. For example, BMS 600 is shown to include building 10, network 446, client devices 448, and fault management system 502. Building 10 is shown to include connected equipment 610, which can include any type of equipment used to monitor and/or control building 10. Connected equipment 610 can include connected chillers 612, connected AHUs 614, connected actuators 616, connected controllers 618, or any other type of equipment in a building HVAC system (e.g., boilers, economizers, valves, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Connected equipment 610 can be outfitted with sensors to monitor particular conditions of the connected equipment 610. For example, chillers 612 can include sensors configured to monitor chiller variables such as chilled water return temperature, chilled water supply temperature, chilled water flow status (e.g., mass flow rate, volume flow rate, etc.), condensing water return temperature, condensing water supply temperature, motor amperage (e.g., of a compressor, etc.), variable speed drive (VSD) output frequency, and refrigerant properties (e.g., refrigerant pressure, refrigerant temperature, condenser pressure, evaporator pressure, etc.) at various locations in the refrigeration circuit. Similarly, AHUs 614 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 monitor and report variables that characterize the performance of the connected equipment 610. Each monitored variable can be forwarded to network control engine 608 as a data point (e.g., including a point ID, a point value, etc.).

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients, etc.), and/or any other time-series values that provide information about how the corresponding system, device, and/or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), and/or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, a fault code, and/or any other information that indicates the current status of connected equipment 610. In some embodiments, equipment status information reported by the connected equipment 610 is in the form of status codes. For example, four types of status codes can be reported by a connected equipment (e.g., chiller), including safety shutdown codes (safety codes), warning codes, cycling codes, and operation codes. Monitored variables and status codes can be referred to as real timeseries data, which may encompass virtual points or calculated metrics.

In some embodiments, each device of connected equipment 610 includes a control panel. The control panel can use the sensor data to shut down the device if the control panel determines that the device is operating under unsafe conditions. For example, the control panel can compare the sensor data (or a value derived from the sensor data) to predetermined thresholds. If the sensor data or calculated value crosses a safety threshold, the control panel can shut down the device and/or operate the device at a derated setpoint. The control panel can generate a data point when a safety shut down or a derate occurs. The data point can include a safety fault code which indicates the reason or condition that triggered the shut down or derate.

Connected equipment 610 can provide monitored variables and equipment status information to a network control engine 608. Network control engine 608 can include a building controller (e.g., BMS controller 366), a system manager (e.g., system manager 503), a network automation engine (e.g., NAE 520), or any other system or device of building 10 configured to communicate with connected equipment 610. In some embodiments, the monitored variables and the equipment status information are provided to network control engine 608 as data points. Each data point can include a point ID and/or a point value. The point ID can identify the type of data point and/or a variable measured by the data point (e.g., condenser pressure, refrigerant temperature, fault code, etc.). Monitored variables can be identified by name or by an alphanumeric code (e.g., Chilled_Water_Temp, 7694, etc.). The point value can include an alphanumeric value indicating the current value of the data point (e.g., 44° F., fault code 4, etc.).

Network control engine 608 can broadcast the monitored variables and the equipment status information to a remote operations center (ROC) 602. ROC 602 can provide remote monitoring services and can send an alert to building 10 in the event of a critical alarm. ROC 602 can push the monitored variables and equipment status information to a reporting database 604, where the data is stored for reporting and analysis. Fault management system 502 can access database 604 to retrieve the monitored variables and the equipment status information.

In some embodiments, fault management system 502 is a component of BMS controller 366 (e.g., within FDD layer 416). For example, fault management system 502 can be implemented as part of a METASYS® brand building automation system, as sold by Johnson Controls Inc. In other embodiments, fault management system 502 can be a component of a remote computing system or cloud-based computing system configured to receive and process data from one or more building management systems. For example, fault management system 502 can connect the connected equipment 610 (e.g., chillers 612) to the cloud and collect real-time data for over a number of points (e.g., 50 points) on those equipment. In other embodiments, fault management system 502 can be a component of a subsystem level controller (e.g., a HVAC controller, etc.), a subplant controller, a device controller (e.g., AHU controller 330, a chiller controller, etc.), a field controller, a computer workstation, a client device, and/or any other system and/or device that receives and processes monitored variables from connected equipment 610.

Fault management system 502 may use the monitored variables and status information to predict upcoming faults (e.g., failure modes) of the connected equipment 610 and take action to prevent or mitigate such faults. The fault management system 502 is described in further detail below with reference to FIGS. 8-13. Communications between fault management system 502 and other systems and/or devices can be direct and/or via an intermediate communications network, such as network 446.

In some embodiments, fault management system 502 provides a web interface which can be accessed by service technicians 606, client devices 448, and other systems or devices. The web interface can be used to access the raw data in reporting database 604, view the results produced by the fault management system, identify which equipment is in need of preventative maintenance, and otherwise interact with fault management system 502. Service technicians 606 can access the web interface to view a list of equipment for which faults are predicted by fault management system 502. Service technicians 606 can use the predicted faults to proactively repair connected equipment 610 before a fault and/or an unexpected shut down occurs. These and other features of fault management system 502 are described in greater detail below.

Figure 7:
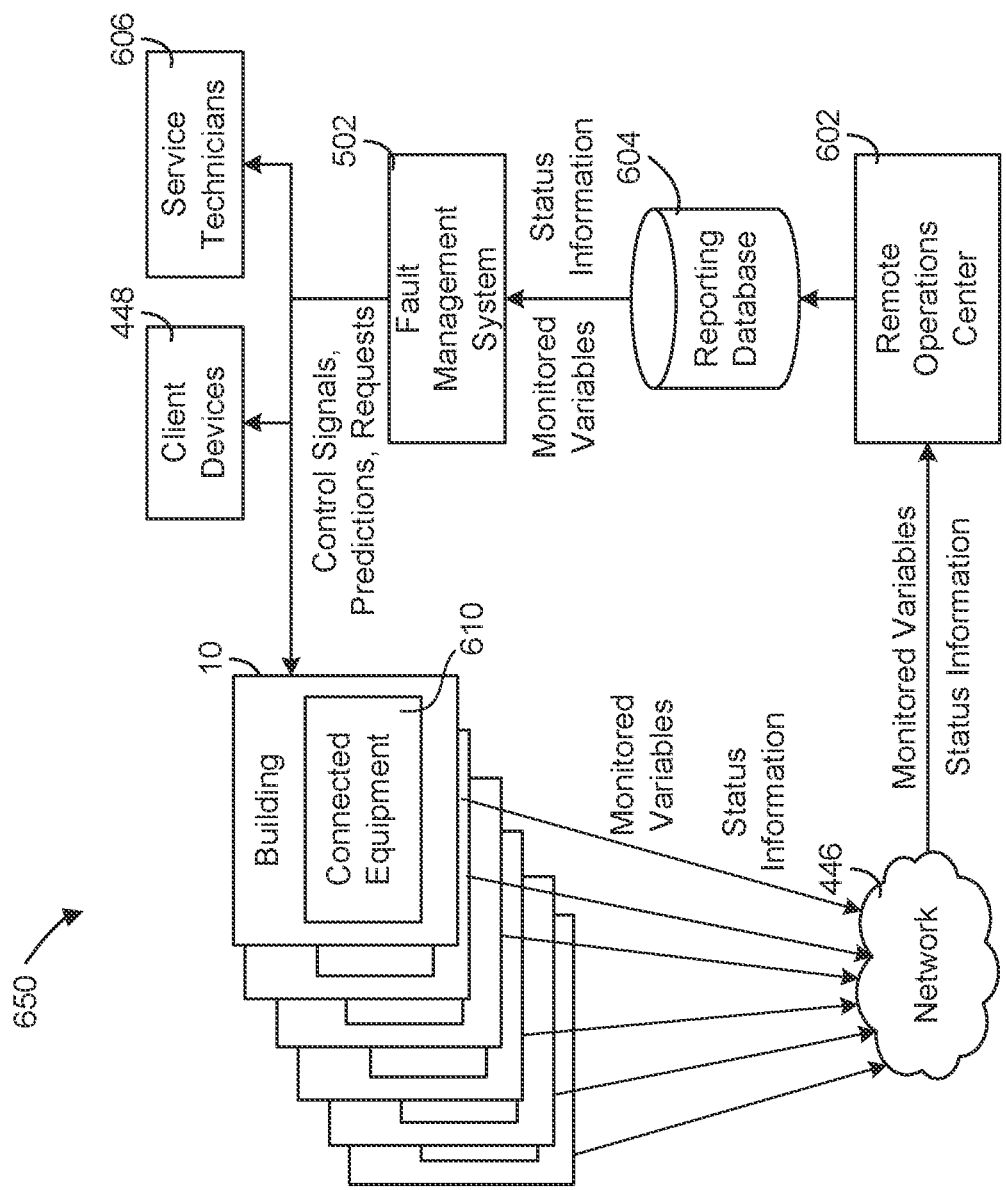
FIG. 7 is a block diagram of another BMS including the fault management system, according to some embodiments.

Referring now to FIG. 7, a block diagram of another building management system (BMS) 650 is shown, according to some embodiments. The building management system 650 of FIG. 7 includes the components of the building management system 600 of FIG. 6, plus any number of additional buildings 10 with additional groups of connected equipment 610. The multiple buildings 10 and multiple units of connected 610 can be considered as a fleet of buildings and/or equipment. The buildings 10 and connected equipment 610 can be located in one location (e.g., one campus) or multiple locations, including across geographic regions, states, provinces, territories, countries, continents, etc. FIG. 7 illustrates that the network 446 can connect all such buildings 10 and connected equipment 610 to the remote operations center 602 (e.g., via the Internet). The fault management system 502 can then be provided as a cloud-based service, for example. In other embodiments, the fault management system 502 is implemented at the edge, for example locally on unit of connected equipment 610.

Figure 8:
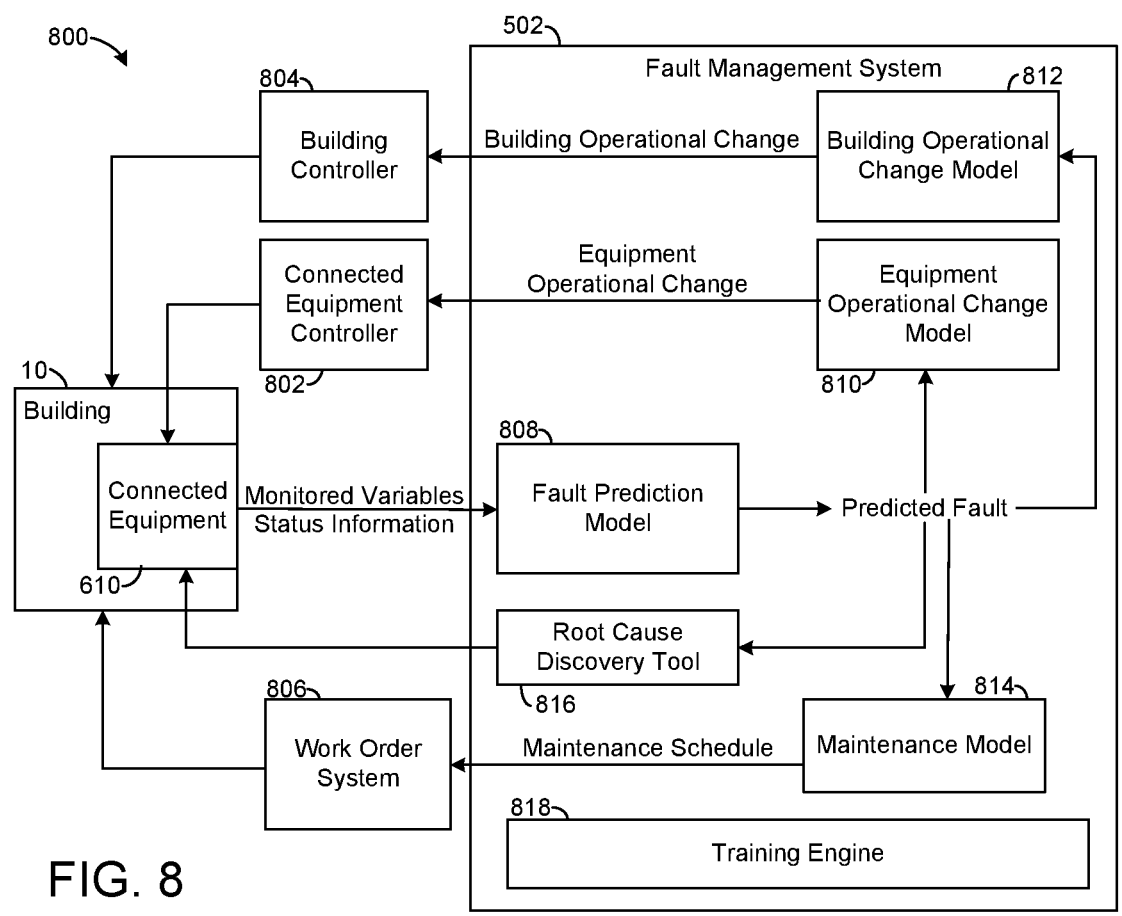
FIG. 8 is a block diagram of a system including a detailed view of the fault management system, according to some embodiments.

Referring now to FIG. 8, a block diagram of a system 800 including a detailed view of the fault management system 502 is shown, according to some embodiments. The system 800 includes the fault management system 502, the connected equipment 610 serving the building 10, a connected equipment controller 802 for the connected equipment 610, a building controller 804 for other controllable devices of the building 10, and a work order system 806. The fault management system 502 is shown as including a fault prediction model 808, an equipment operational change model 810, a building operational change model 812, a maintenance model 814, root cause discovery tool 816, and training engine 818. The fault management system 502 can be implemented as one or more processors and one or more non-transitory computer readable media storing program instructions that, when executed by one or more processors, cause the processors to perform the operations attributed herein to the fault management system 502 and components thereof. The fault management system 502 can be implemented as a cloud-based computing resource, at the edge (e.g., embedded in the connected equipment), locally at data infrastructure of the building 10, or various combinations thereof in various embodiments.

The fault prediction model 808 is shown as receiving data from and/or relating to the connected equipment 610. The data can include timeseries values for monitored variables. The data can also include status information such as status codes indicating normal operation, on/off status, fault conditions, etc. The fault prediction model 808 can stream such data continuously from the connected equipment 610 or receive batches of such data, for example.

The fault prediction model 808 is configured to predict a future fault based on the timeseries data relating to the connected equipment 610. The fault prediction model 808 can include a neural network or other artificial intelligence model trained to predict future faults. The fault prediction model 808 can work as a classifier to classify sets of timeseries data relating to the connected equipment 610 as corresponding to conditions that indicate different types of faults that will occur, in various scenarios. The fault prediction model 808 thereby outputs a predicted fault. The predicted fault output by the fault prediction model 808 can include a type of the fault, a predicted timing of the fault, a confidence in the fault prediction and/or other information relating to a future fault condition predicted to occur by the fault prediction model 808.

In some embodiments, the predicted fault from the fault prediction model 808 is communicated to the equipment operational change model 810. The equipment operational change model 810 is configured to determine an operational change for the equipment intended to and/or expected to prevent or mitigate the predicted fault. For example, changing an internal operating settings of the connected equipment 610 may help to mitigate the predicted fault (e.g., reduce consequences of the fault, reach a less severe fault condition, delay the fault condition, etc.) or prevent the predicted fault (e.g., enable continuation of normal operation).

The equipment operational change model 810 receive the monitored variables and/or status information from the connected equipment 610 and use such information in combination with the predicted fault to determine the operational change. The equipment operational change model 810 may be a neural network or other artificial intelligence model trained using an actual and/or synthetic set of timeseries data showing results of different operational changes with respect to preventing or mitigating fault conditions (e.g., trained by training engine 818). As another example, the equipment operational change model 810 can include a rules-based approach whereby predefined rules are executed to determine the operational change based on the predicted fault. As one such example, the predefined rules may indicate that a certain setpoint should be adjusted in one direction by a certain amount in response to prediction of a particular type of fault. Various such examples are possible and enable the equipment operational change model 810 to output an equipment operational change to the connected equipment controller 802 as shown in FIG. 8. In response to the equipment operational change from the fault management system 502, the connected equipment controller 802 operates the connected equipment 610 to automatically implement the equipment operational change as an automated action. The fault management system 502 thereby alters operation of the connected equipment 610 to prevent or mitigate the predicted fault.

In some embodiments, the predicted fault from the fault prediction model 808 is communicated to the building operational change model 810. The building operational change model 812 is configured to determine a building operational change intended to and/or expected to prevent or mitigate the predicted fault. The building operational changes are changes to be implemented using one or more building devices other than the connected equipment 610 of relevance in the predicted fault. For example, a building operational change can include changing a load on the connected equipment 610 (e.g., increasing or decreasing demand for a resource generated by the connected equipment 619 by changing other building setpoints), time-shifting operations of the connected equipment 610, changing environmental conditions around the connected equipment 610, changing characteristics of an input resource to the connected equipment 610, etc.

The building operational change model 812 may receive various building data, including in some examples the monitored variables and status information from the connected equipment 610, and use such information in combination with the predicted fault to determine a building operational change to prevent or mitigate the predicted fault.

The building operational change model 812 may be a neural network or other artificial intelligence model trained using an actual and/or synthetic set of timeseries data showing results of different operational changes with respect to preventing or mitigating fault conditions (e.g., trained by training engine 818). As another example, the building operational change model 812 can include a rules-based approach whereby predefined rules are executed to determine the operational change based on the predicted fault. As one such example, the predefined rules may indicate that a certain building setpoint should be adjusted in one direction by a certain amount in response to prediction of a particular type of fault. Various such examples are possible and enable the building operational change model 812 to output an equipment operational change to the building controller 808 as shown in FIG. 8. In response to the building operational change from the fault management system 502, the building controller 802 operates the building 10 (e.g., one or more building devices in building 10) to automatically implement the building operational change as an automated action. The fault management system 502 thereby alters operation of the building 10 to prevent or mitigate the predicted fault of the connected equipment 610.

In some embodiments, the predicted fault from the fault prediction model 808 is provided to the maintenance model 814. The maintenance model 814 is configured to determine a maintenance schedule intended to and/or expected to prevent or mitigate the predicted fault, for example in an optimal manner. The maintenance schedule can define one or more maintenance actions to be taken at one or more future times, for example by one or more service technicians. The maintenance actions can include maintenance on the connected equipment 610 and/or on other elements of the building 10.

The maintenance model may receive various other data inputs, including monitored variables and status information from the connected equipment, service technician schedules, parts availability and lead time information, and/or maintenance budget information, etc. and use such information in combination with the predicted fault from the fault prediction model 808 to determine a maintenance schedule for the building 10.

The maintenance model 814 may be a neural network or other artificial intelligence model trained using an actual and/or synthetic set of timeseries data showing results of different maintenance actions with respect to preventing or mitigating fault conditions (e.g., trained by training engine 818). As another example, the maintenance model 814 can include a rules-based approach whereby predefined rules are executed to determine the operational change based on the predicted fault. As one such example, the predefined rules may indicate that a certain maintenance action should be performed before predicted occurrence of a particular type of fault to prevent the fault. Various such examples are possible and enable the maintenance model 814 output a maintenance schedule to the work order system 806 as shown in FIG. 8. In response to the maintenance schedule from the fault management system 502, the work order system 806 causes the scheduled maintenance to be performed, for example by automatically generating a work order for the scheduled maintenance and transmitting such orders to technicians, automatically ordering required tools or parts for performing the scheduled maintenance, etc. The fault management system 502 thereby causes performance of maintenance actions to prevent or mitigate the predicted fault.

FIG. 8 shows the fault management system 502 as also including a root cause discovery tool 816. The root cause discovery tool 816 is shown as receiving the predicted fault from the fault prediction model 808 and as being in communication with the connected equipment 610. The root cause discovery tool 816 may perform various operations to diagnose the root cause of a predicted fault, occurring fault, or previous fault. In some examples, the root cause discovery tool 816 is configured to perform experiments by altering operation of the connected equipment 610 and/or other elements of the building 10 to generate information that can help indicate the root cause of a fault. The root cause discovery tool 816 may also be configured to determine whether an equipment operational change, a maintenance action, or a building operational change is most suitable to (e.g., most likely, most reliable, most efficient, etc.) preventing or mitigating a predicted fault, and coordinate operation of the various elements of the fault management system 502 accordingly (e.g., to cause implementation of the most suitable solution while causing omission of operation of other components). In various embodiments, one or more of the root cause discovery tool 816, maintenance model 814, building operational change model 812, and equipment operational change model 810 are omitted.

The fault management system 502 is also shown as including training engine 818. The training engine 818 can be adapted to train, tune, generate, update, adjust, etc. the fault prediction model 808, the equipment operational change model 810, the building operational change model 812, and/or the maintenance model 814 in various embodiments. The training engine 818 can implement supervised or unsupervised training approaches in various embodiments, for example using a generative adversarial network (GAN), including a conditional embedder generative adversarial network (CEGAN) as described below. The training engine 818 can access various data from and relating to the connected equipment 610 and the building 10 and use such data for development and adjustment of various elements of the fault management system 502 in various embodiments.

Training with Multi-Device Data

Referring generally to FIGS. 9-17, approaches for a generating various fault prediction models using data from or otherwise relating to multiple chillers are shown according to various embodiments. Included in the disclosure is a multi-chiller dataset generation strategy that materializes an implementation of chiller per fault type modeling, where separate models can be provided for different fault types for a given chiller. A single chiller likely will not have sufficient data for multiple different fault types (e.g., as data corresponding to faults may be 1% or less of all operating data, and even smaller for any particular type of fault), creating a challenge for model training which would generally result in inaccurate models. The present disclosure includes approaches for using data from multiple chillers in training while tuning a model for a particular chiller, enabling improved prediction accuracy. The approaches herein also provide a faster (more efficient, less resource intensive) model training strategy using transfer learning to facilitate deployment of a new chiller. Iterative model updates can also be used to improve fault prediction performance over time, including for example by encountering new fault types and sensor value changes over time. These and other advantages will become apparent from the following description. While the following disclosure refers to chillers, the approaches herein can be readily applied to other types of connected equipment (e.g., boilers, air handling units, rooftop units, actuators, dampers, valves, or any other type of HVAC equipment or building equipment).

Figure 9:
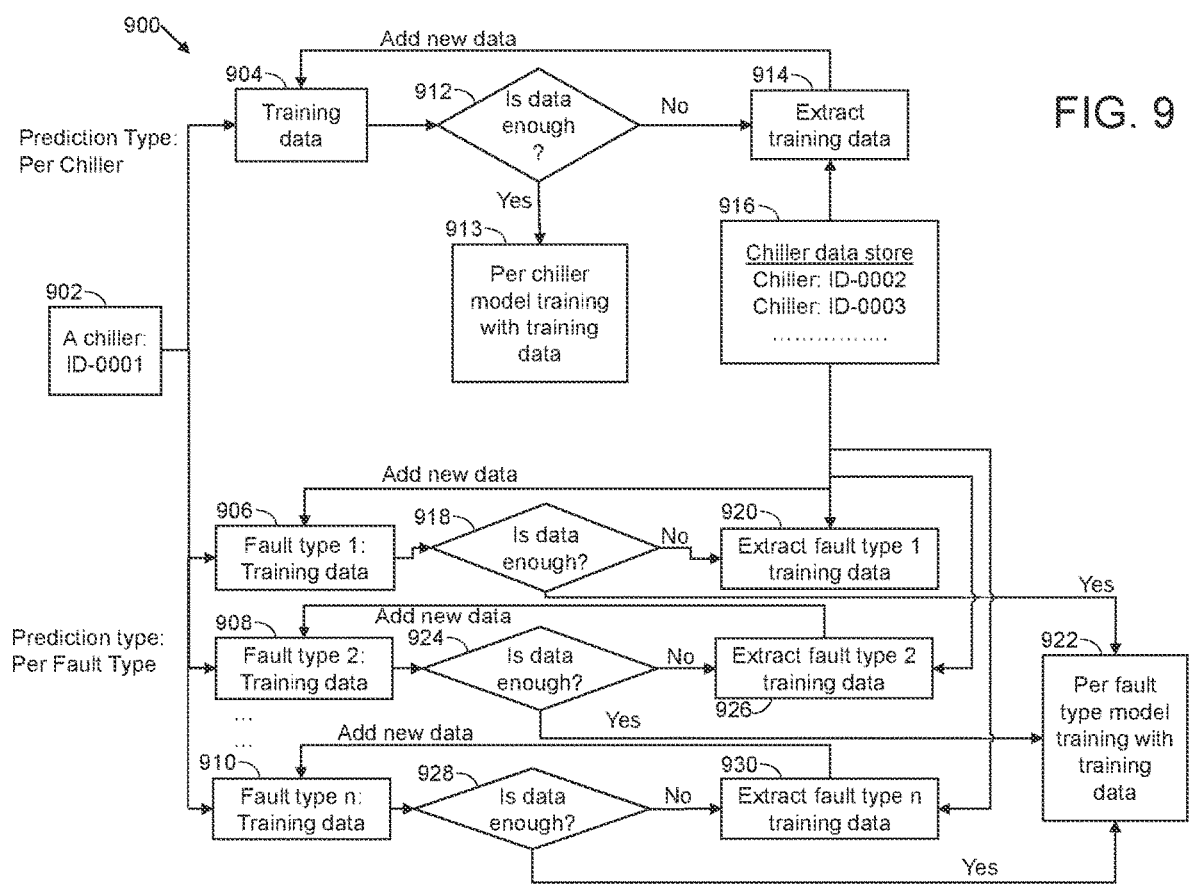
FIG. 9 is a flowchart of a process for training data selection, according to some embodiments.

Referring now to FIG. 9, a flowchart of a process 900 is shown, according to some embodiments. Process 900 can be executed by the training engine 818 of FIG. 8, for example. Process 900 can be used to implement a per chiller prediction type, where a unified model is trained to predict multiple types of faults for a chiller, and/or a per fault prediction type, where multiple models are trained for a given chiller to predict multiple types of fault (e.g., one fault type per model). As labelled in FIG. 9, the top portion of FIG. 9 can implement a per chiller prediction type and a bottom portion of FIG. 9 can implement a per fault prediction type. In the example shown, both types of models are produced by process 900 following the steps described below.

At block 902, a chiller (shown having identification number ID-0001) is provided (e.g., installed, deployed, observed, connected, operated, etc.). The chiller may be any type of chiller. In other embodiments, the chiller is a different type of connected equipment. The chiller operates over time at block 902, creating data relating to operation of the chiller. The chiller (and/or various sensors, devices, etc. associated with the chiller) provides training data, which can be packaged as a complete set of training data (shown as block 904) and subsets of training data associated with different types of faults (shown as block 906 for a first fault type, block 908 for a second fault type, through block 910 for an $n^{th}$ fault type). Block 902 can include a step of preprocessing data associated with the chiller into the complete set provided at block 904 and the subsets provided in block 906, block 908, and block 910. The number of subsets provided corresponds to a number of different types of faults which occurred for the chiller and/or a number of different types of faults for which predictive models are desired.

The complete set of training data provided at step 904 is provided to a decision block 912 which determines whether the training data is enough, i.e., sufficient for training a fault prediction model for the chiller ID-0001. Checking whether the training data is enough can include comparing an amount of the data (e.g., number of points, duration of time represented, amount of memory used) to a threshold (e.g., a threshold number of points, a threshold duration of time represented, a number of gigabytes of memory to be used). In some embodiments, an amount of some feature represented in the training data can also be counted and compared to a threshold, e.g., a total number of faults which occurred in the training data. In other embodiments, checking whether the training data is enough can include performing one or more automated evaluations of the training data, for example using one or more statistical metrics to assess whether the training data is enough. In some embodiments, determining whether the training data is enough includes using the data to train a model, testing the performance (e.g., accuracy) of the trained model, and determining that the training data is enough if the model passes the test (e.g., accuracy is better than a threshold).

If the training data is determined to be enough ("yes" at block 912), process 900 proceeds to block 913 where per chiller model training is executed using the training data from block 904 in order to produce a fault prediction model for the chiller (i.e., for chiller ID-0001). Model training can be executed according to various teachings described elsewhere herein, for example.

Figure 10:
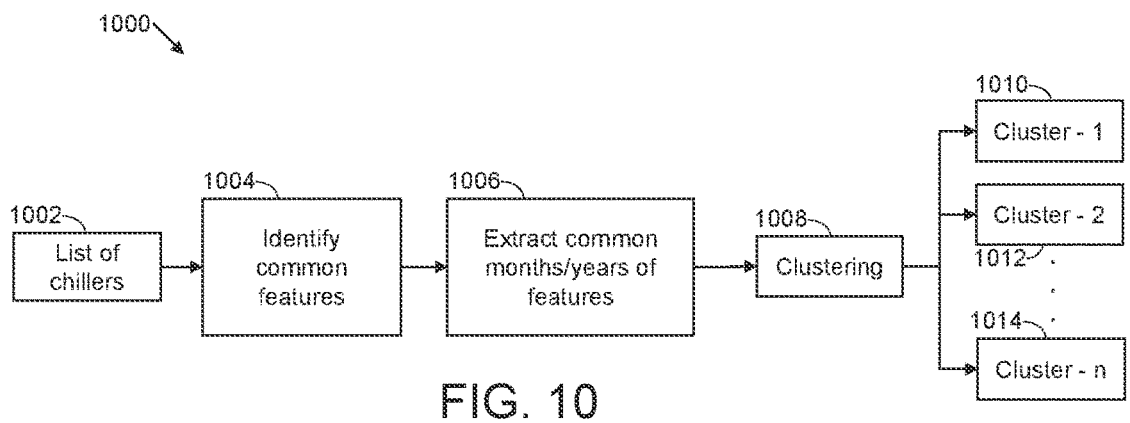
FIG. 10 is a flowchart of a process for clustering chillers, according to some embodiments.
Figure 11:
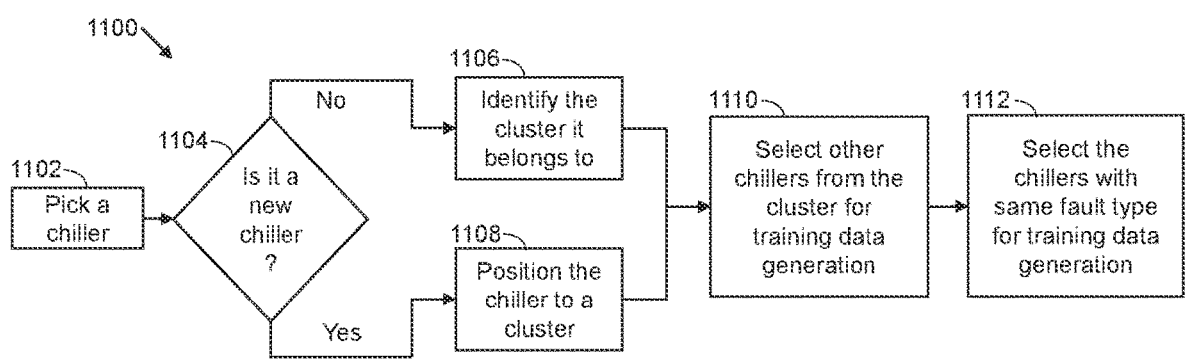
FIG. 11 is a flowchart of a process for selecting training data for model training, according to some embodiments.

If the training data is not enough, ("no" at block 912), process 900 proceeds to block 914 where additional training data is extracted from a chiller data store (shown as block 916) and then added to the training data (shown by process 900 looping back to block 904 with the addition of new data. The chiller data store includes data from and/or relating to multiple chillers (shown as chiller ID-0002, chiller ID-0003, etc.). In some embodiments, each iteration of block 914 includes extracting data relating to one of the multiple chillers from the chiller data store, with a subsequent iteration corresponding to extracting data for a subsequent chiller (e.g., data for chiller ID-0002 extracted in a first iteration, data for chiller ID-0004 extracted in a second iteration, etc.), for example with the chillers ordered (ranked, etc.) based on similarities between the additional chillers and the first chiller operated in block 902. Various features for clustering and ordering chillers for data selection are shown in FIGS. 10-11 and described in detail with reference thereto below.

Accordingly, process 900 can iterate through blocks 912, 914, and 904 as shown until enough data is included (i.e., "yes" at block 912) such that multi-chiller training data is provided to block 913 for model training based on the multi-chiller data. This approach enables sufficient data to be used for quality model training by sampling from multiple chillers, while prioritizing data from the chiller of interest (i.e., chiller ID-0001 in FIG. 9) so that the model is as tuned as much as possible to the particular operations of that specific chiller.

As shown, process 900 also enables per fault type modeling. As shown, training data for a first fault type (block 906) is assessed to determine whether that data is enough for model training at block 918. Block 918 may operate similarly to block 912, for example with different thresholds, tests, metrics, etc. used to assess whether sufficient data relating to the first fault type is available to train a model to predict occurrence of the first fault type. If sufficient data is not available, process 900 moves to block 920 where training data corresponding to the first fault type is extracted from the chiller data store (block 916). Block 920 can include identifying data in the chiller data store 916 which corresponds to occurrences of the first fault type for the multiple other chillers (e.g., chiller ID-0002, chiller ID-0003, etc.). Process 900 can loop through block 918, block 920, and block 906 until the data is determined to be enough ("yes" at block 918) at which point the data corresponding to the first fault type is provided to block 922 where per fault type model training is executed. Per fault type model training in block 922 uses the data for the first fault type to train a model that predicts occurrences of faults of the first fault type for the chiller in block 902 (i.e., chiller ID-0001).

Similar loops are also provided for a second fault type through an $n^{th}$ fault type, such that per fault type model training is enabled for any number of fault types. As shown in FIG. 9, training data relating to chiller ID-0001 and for a second fault type is provided at block 908 and is assessed in block 924 to determine if such data is sufficient for training a model to predict occurrences of the second fault type. Block 924 may be implemented as described above for block 918. If data is not sufficient ("no" at block 924), process 900 continues on to block 926 where training data corresponding to the second fault type is extracted from the chiller data store of block 916. Process 900 then loops back to block 908, adding the extracted training data to the original training data from chiller ID-0001 which is then provided to block 924. Once the data is assessed to be enough at block 924, the data is provided to block 922 for per fault type model training, i.e., to train a model to predict faults of the second fault type.

Also as shown in FIG. 9, training data relating to chiller ID-0001 and for an $n^{th}$ fault type is provided at block 910 and is assessed in block 928 to determine if such data is sufficient for training a model to predict occurrences of the $n^{th}$ fault type. The value "n" may be any integer (e.g., three, five, ten, twenty, one hundred). Block 928 may be implemented as described above for block 918. If data is not sufficient ("no" at block 928), process 900 continues on to block 930 where training data corresponding to the $n^{th}$ fault type is extracted from the chiller data store of block 916. Process 900 then loops back to block 908, adding the extracted training data to the original training data from chiller ID-0001 which is then provided to block 928. Once the data is assessed to be enough at block 928, the data is provide to block 922 for per fault type model training, i.e., to train a model to predict faults of the $n^{th}$ fault type.

The process 900 of FIG. 9 thereby enables training of fault prediction models specific to different fault types and tuned as much as possible, separately for each type of fault, to a particular chiller (in the example of FIG. 9, chiller ID-0001). That is, process 900 includes using training data from other chillers only to the extent needed to have enough data to train such models, and does so independently for each type of fault, advantageously providing highly accurate models trained on sufficient data while biasing each model towards specific characteristics of the chiller of interest (e.g., chiller ID-0001) to the extent possible for that particular model given the available training data for different fault types.

Referring now to FIG. 10, a process 1000 for clustering chillers is shown, according to some embodiments. The clustering of process 1000 can be used in process 1100 of FIG. 11, described below, to facilitate selection of training data for model training. Process 1000 can be executed by the training engine 818 in some embodiments.

At block 1002, a list of chillers 1002 is received. The list of chillers 1002 may include all connected equipment 610 connected to a fault management system 502 as in the system 650 of FIG. 7, for example. The chillers may be installed at various locations and associated with various end users, owners, distributors, etc.

At block 1004, common features of the chillers are identified. For example, points common to the chillers (e.g., sensor measurements, power consumption, operating setpoints, etc.) may be identified. Block 1004 may also include identifying common months or years of such common features, i.e., identifying which data from different chillers corresponds to the same time periods. In some examples, the common features are latent features used by an artificial intelligence approach, for example used as part of an auto-encoder-based model structure. In such embodiments, block 1004 can include passing data from the list of chillers through an encoder or other type of model.

At block 1006, based on the identified common features, the common features are extracted from a complete set of training data. The extracted data may correspond to common months and/or years of data identified in block 1004. The extracted data is also for common points available for the listed chillers from block 1002. The extracted data is provided to block 1008.

At block 1008, clustering is performed based on the extracted data. By extracting common features (including, for example, latent features) from the different chillers, clustering can be performed based on directly comparable values across the different chillers. Clustering includes comparing characteristics of different chillers based on the extracted data, and sorting the chillers into different clusters based on similarities between the characteristics. For example, an approach to clustering may include plotting the chillers in a multi-dimensional space based on the values of the common features and determining groups of chillers which are clustered together in such a modeling space. For example, a principle component analysis approach may be used. Various approaches for clustering are possible, including artificial intelligence classification approaches. As shown in FIG. 10, clustering in block 1008 results in chillers arranged in a first cluster 1010, a second cluster 1012, through an $n^{th}$ cluster 1014.

Referring now to FIG. 11, a process 1100 of selecting training data for model training for a chiller is shown, according to some embodiments. Process 1100 can be executed by the training engine 818, for example. Process 1100 can use the clusters output from process 1000, for example.

At step 1102, a chiller is picked. The chiller may be picked (e.g., from a set of possible chillers) because one or more fault prediction models are desired to be created for the chiller. The chiller may be picked by a user via a user interface in some embodiments. In some embodiments, the chiller is picked automatically (e.g., by the training engine 818), for example in response to an automatic determination that no or insufficient fault prediction models are available for that chiller. In some embodiments, the chiller is picked at step 1102 in response to the chiller being brought online (e.g., connected to a network, connected to a building management system, connected to fault management system 502).

At step 1104, a determination is made as to whether the picked chiller is a new chiller, e.g., a newly installed chiller and/or a chiller not previously connected to fault management system 502. The determination can be made by checking whether the chiller is on a list of existing chillers (e.g., from block 1002 of FIG. 10).

If the chiller is not a new chiller (i.e., is a pre-existing chiller, "no" from step 1104), process 1100 proceeds to step 1106 where the cluster to which the chiller belongs is identified. Step 1104 uses the clusters (e.g., first cluster 1010, second cluster 1012, $n^{th}$ cluster 1014), one of which will already include the chiller pieced in step 1102 in this scenario. Step 1104 can thus include finding the chiller within the clusters and identifying the chiller that contains the chiller.

If the chillers is a new chiller ("yes" from step 1104), process 1100 proceeds to step 1108 where the chiller is positioned to a cluster. The chiller can be positioned to a cluster based on one or more characteristics of the chiller. For example, any features of the chiller which would be considered common features in step 1004 of process 1000 can be identified, extracted, and used in accordance with the same approach used by clustering 1008 to determine the appropriate cluster for the new chiller. The relevant features of the new chiller used for clustering may be latent features of the new chiller.

Steps 1106 and 1108 thereby identify a cluster associated with the chiller selected in step 1102. Based on the identified cluster, step 1110 selects other chillers from the identified cluster for training data generation. Step 1110 can include selecting all chillers from the identified cluster. In some embodiments, step 1110 includes selecting a subset of the chillers in the identified cluster, for example based on some ranking of the chillers in the identified cluster. For example, the subset of chillers from the identified cluster in step 1110 may be the chillers with the richest data (e.g., most fault occurrences), the most total data (e.g., most points, longest time represented), the chillers most similar to the selected chiller (e.g., based on similar considerations used for clustering, closest in a multi-dimensional modeling space, etc.), or some other characteristic of the clustered chillers.

At step 1112, a further selection is made from the chillers selected in step 1110 in order to selected chillers with common fault types for training data generation. For example, the chillers selected in step 1110 can be sorted into buckets for each fault type (e.g., with some chillers being sorted into multiple buckets if data for such chillers includes multiple fault types). Step 1112 thereby sorts data in a manner that facilitates training of models for particular fault types.

Training data from chillers as selected and sorted via process 1100 can then be used to training one or more fault prediction models for the selected chiller, for example separate models (e.g., sub-models) for the different fault types used in step 1112. Process 1100 thereby enables model training from multi-chiller data while increasing accuracy by requiring commonalities between the chillers used as data sources and the selected chiller for which models are trained.

Figure 12:
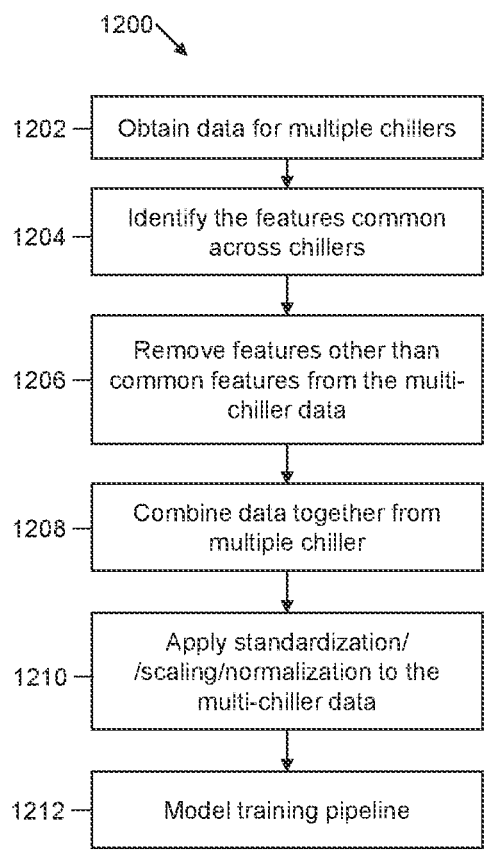
FIG. 12 is a flowchart of a process for pre-processing data from multiple chillers for a model training pipeline, according to some embodiments.

Referring now to FIG. 12, a flowchart of a process 1200 for pre-processing data from multiple chillers for a model training pipeline is shown, according to some embodiments. Process 1200 can be executed by the training engine 818, for example.

At step 1202, data from multiple chillers is obtained. For example, the data may be obtained from the chillers and/or related sensors, devices etc. via network 446 as shown in FIG. 7. At step 1204, common features across the chillers are identified. Step 1204 may be implemented similarly to step 1004 described above. At step 1204, in response to identification of common features across the multiple chillers, other features are removed from the multi-chiller data for each chiller, leaving only the common features.

At step 1208, the data is combined together from the multiple chillers. Combining the data together can include resampling or aligning the data, for example such that timeseries data from multiple chillers has the same frequency, is for the same time steps, etc. Various such combining actions may be executed. At step 1210, after the data is combined, standardization, scaling and/or normalization is applied to the combined data. The standardized, scaled, and/or normalized data is then provided to a model training pipeline in step 1212.

Figure 13:
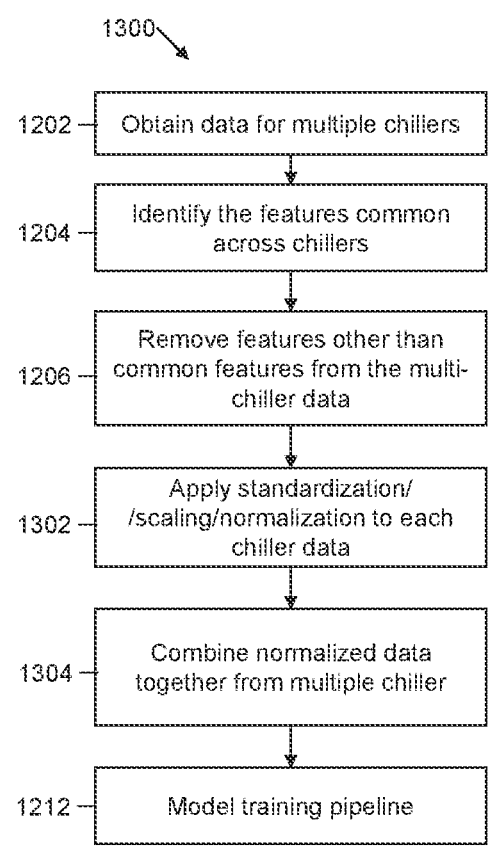
FIG. 13 is a flowchart of another process for pre-processing data from multiple chillers for a model training pipeline, according to some embodiments.

Referring now to FIG. 13, a flowchart of a process 1300 for pre-processing data from multiple chillers for a model training pipeline is shown, according to some embodiments. Process 1300 can be executed by the training engine 818, for example. As shown, process 1300 includes step 1202, step 1204, step 1206, and step 1212 from FIG. 12. Relative to process 1200, steps of standardization/scaling/normalization and data combination are reversed, such that processing 1300 includes a step 1302 of applying standardization/scaling/normalization to each chiller's data before combining the standardized, scaled, and/or normalized data together in step 1304. Although this example shows reordering of one step, it should be understood that various reordering of steps of the processes disclosed herein are within the scope of the present disclosure.

Figure 14:
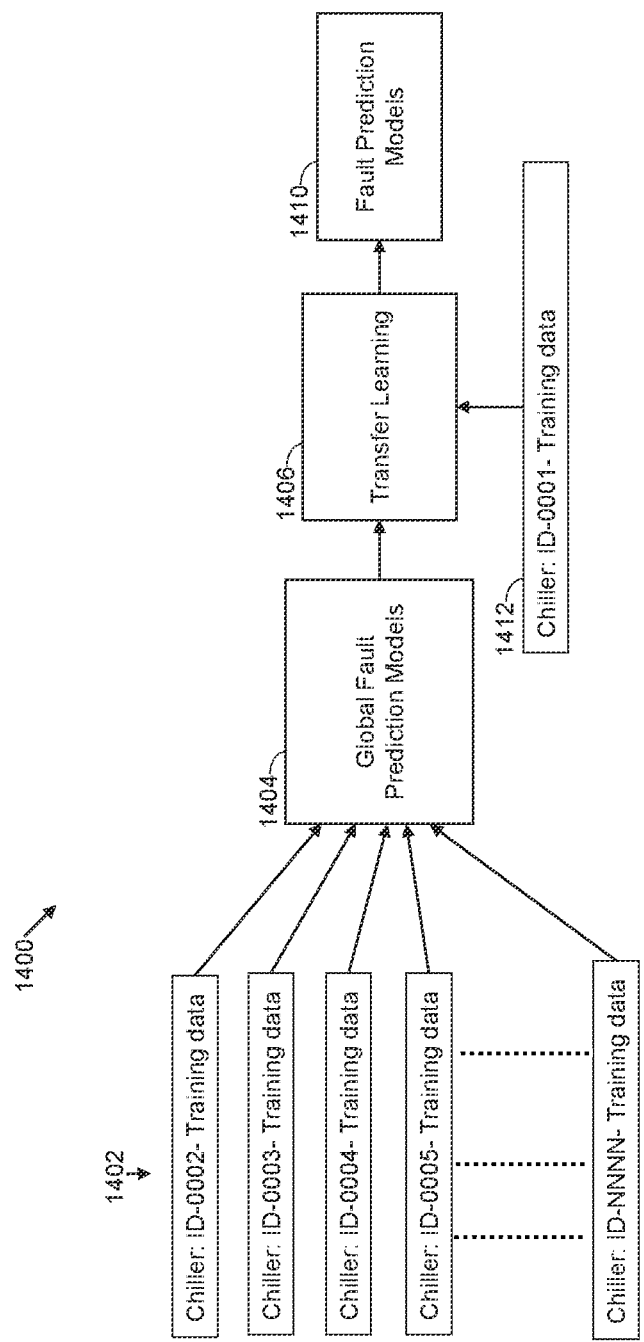
FIG. 14 is a flowchart of a process for adapting one or more models for a particular chiller is shown, according to some embodiments.

Referring now to FIG. 14, a flowchart of a process 1400 for adapting one or more models for a particular chiller is shown, according to some embodiments. Process 1400 can be execute by the training engine 818 in some embodiments.

Process 1400 is shown as using inputs 1402 to create global fault prediction models 1404. The inputs 1402 are training data for multiple chillers, shown as any number of chillers (e.g., 5, 10, 50, 100, 1000, 5000, etc.). Using data from the multiple chillers, the global fault prediction models 1404 are generic to the multiple chillers shown as inputs 1402. The global fault prediction models 1404 can be generated using the inputs 1402 and any suitable model fitting, machine learning, or artificial intelligence approach. The global fault prediction models 1404 may include separate models for multiple different fault types, such that each of such sub-models is configured to predict occurrence of a corresponding type of fault for a generic (e.g., average, unspecified) chiller.

The global fault predictions models 1404 are provided as inputs to a transfer learning step 1406. The transfer learning step 1406 also receives additional training data 1412 for an additional chiller (shown as chiller ID-0001). The additional chiller is a chiller for which fault prediction models are desired, for example a new chiller for which fault prediction models have not yet been created.

The transfer learning step 1406 adapts the global fault prediction models based on the additional training data 1412 for the additional chiller in order to tune the global fault prediction models specifically from the additional chiller, and outputs fault prediction models 1410 for the additional chiller. The transfer learning step 1406 may including re-training a sub-portion of each of the global fault prediction models, as in the example of FIG. 15.

Figure 15:
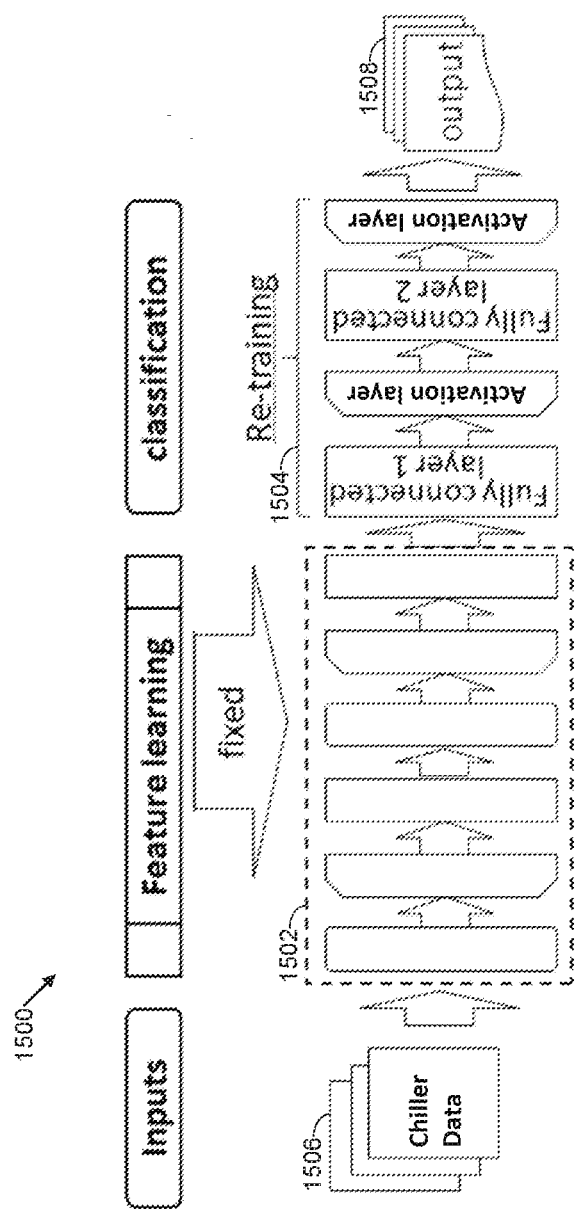
FIG. 15 is a diagram of a fault prediction model, according to some embodiments.

As shown in FIG. 15, according to some embodiments, a global fault prediction model may be provided as a neural network 1500 that includes a first portion 1502 including multiple layers and a second portion 1504 including multiple layers. The first portion 1502 includes chiller data 1506 as an input and passes the chiller data 1506 through multiple neural network layers to provide an intermediate output to the second portion 1504, which then processes the intermediate output to produce a final output 1508. As illustrated in FIG. 15, the first portion 1502 corresponds to feature learning and is fixed during transfer learning 1406, while the second portion 1504 is re-trained during transfer learning 1406 using the additional training data 1412 for the additional chiller. The second portion is shown as including a first fully connected layer, a first activation layer, a second fully connected layer, and a second activation layer, arranged in that order, and may include other layers in other embodiments. By fixing the first portion 1502 and retraining only the second portion 1504, the volume of additional data 1412 needed for transfer learning is reduced while the neural network 1500 retains knowledge gained in global training to provide the global fault prediction models 1410. These and similar model structures can be used in various embodiments of process 1400.

Figure 16:
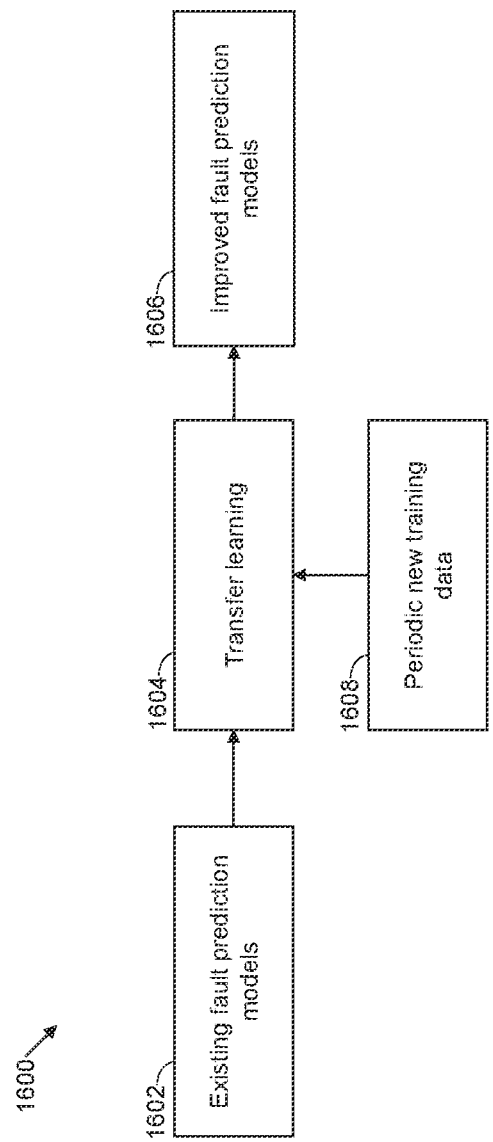
FIG. 16 is a flowchart of a process for transfer learning, according to some embodiments.

Referring now to FIG. 16, a flowchart of a process 1600 for iterative model updates is shown, according to new embodiments. Process 1600 can be executed by the training engine 818, for example.

As shown in FIG. 16, existing fault prediction models 1602 are provided. The existing fault prediction models 1602 may be results of the various processes described above. As shown, the existing fault prediction models 1602 are provided to a transfer learning step 1604 along with periodic new training data. The periodic new training data 1608 may be training data for one or more chillers collected over a time period and provided periodically (e.g., monthly, weekly, daily, hourly, quarterly, annually, seasonally, etc.). The transfer learning step 1604 can be executed to adjust the existing fault prediction models 1602 based on the periodic new training data 1608, so that improved fault prediction models 1606 are provided which account for the latest data for one or more corresponding chillers and are tuned to recent conditions for the one or more corresponding chillers. The transfer learning step 1604 can include retraining one sub-portion of a model while a remainder of the model remains fixed, for example as in the example of FIG. 15. Fault prediction models are thereby periodically improved over time.

Referring now to FIG. 17, a comparison of experimental results is shown, according to an example experiment. FIG. 17 includes a first box 1700 with a set of results from single chiller training, where data from a single chiller was used to train a fault prediction model (in particular, a shutdown prediction model) for that chiller. FIG. 17 also shows a second box 1702 with a set of results from multi-chiller training according to the teachings herein, where data from nineteen chillers was used in training the same type of shutdown prediction model as in the first box 1702. In particular, data corresponding to fault occurrences plus thirty days of prior normal data for those nineteen chillers was used. As is clear from the results shown in the first box 1700 relative to the second box 1702, the multi-chiller training as described herein provides significantly better scores for accuracy, precision, recall, and other metrics as compared to single model training. The teachings herein thus provide advantages over other technological solutions associated with predicting and management chiller faults.

CONFIGURATION OF EXEMPLARY EMBODIMENTS

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system, comprising:
    a first device of building equipment;
    a plurality of additional devices of building equipment; and
    a computing system programmed to:
        assess whether a data set from the first device is sufficient to train a fault prediction model for the first device;
        in response to a determination that the data set from the first device is sufficient to train the fault prediction model for the first device, train the fault prediction model for the first device using the data set from the first device;
        in response to a determination that the data set from the first device is insufficient to train the fault prediction model for the first device:
            generate a ranking of the plurality of additional devices based on similarities between the first device and the plurality of additional devices;
            augment the data set with supplemental data from one or more of the plurality of additional devices to obtain an augmented data set, the supplemental data obtained from each subsequent device of the plurality of additional devices in an order based on the ranking until the augmented data set is sufficient to train the fault prediction model; and
            train the fault prediction model for the first device using the augmented data set; and
        influence operations of the first device using the fault prediction model.

2. The system of claim 1, wherein the computing system is programmed to augment the data set with the supplemental data from the one or more of the plurality of additional devices by increasing an amount of the supplemental data until the augmented data set is sufficient to train the fault prediction model.

3. The system of claim 1, wherein the computing system is programmed to augment the data set with the supplemental data from the one or more of the plurality of additional devices by increasing a count of the one or more of the plurality of additional devices from which the supplemental data is used until the augmented data set is sufficient to train the fault prediction model.

4. The system of claim 1, wherein the supplemental data is specific to a particular type of fault and the fault prediction model predicts the particular type of fault.

5. The system of claim 1, wherein the fault prediction model is per device, wherein the computing system is further programmed to train a plurality of fault prediction models including the fault prediction model, each of the plurality of fault prediction models configured to predict a different type of fault.

6. The system of claim 1, wherein the computing system is programmed to augment the data set with the supplemental data from the one or more of the plurality of additional devices by:
   clustering the plurality of additional devices in a plurality of clusters based on characteristics of the plurality of additional devices;
   associating the first device with a first cluster of the plurality of clusters; and
   extracting the supplemental data from the first cluster.

7. The system of claim 1, wherein influencing the operations of the first device using the fault prediction model comprises identifying, on an interface, that the first device is in need of maintenance and causing maintenance to be performed on the first device.

8. A method, comprising:
   assessing whether a data set from a first device of building equipment is sufficient to train a fault prediction model for the first device;
   in response to a determination that the data set from the first device is sufficient to train the fault prediction model for the first device, training the fault prediction model for the first device using the data set from the first device;
   in response to a determination that the data set from the first device is insufficient to train the fault prediction model for the first device, augmenting the data set with supplemental data from one or more of a plurality of additional devices of building equipment to obtain an augmented data set and training the fault prediction model for the first device using the augmented data set;
   ranking the plurality of additional devices based on similarities between the first device and the plurality of additional devices, wherein the supplemental data is obtained from each subsequent device of the plurality of additional devices in an order based on the ranking until the augmented data set is sufficient to train the fault prediction model; and
   influencing operations of the first device using the fault prediction model.

9. The method of claim 8, comprising augmenting the data set with the supplemental data from the one or more of the plurality of additional devices by increasing an amount of the supplemental data until the augmented data set is sufficient to train the fault prediction model.

10. The method of claim 8, comprising augmenting the data set with the supplemental data from the one or more of the plurality of additional devices by increasing a count of the one or more of the plurality of additional devices from which the supplemental data is used until the augmented data set is sufficient to train the fault prediction model.

11. The method of claim 8, wherein the supplemental data is specific to a particular type of fault and the fault prediction model predicts the particular type of fault.

12. The method of claim 8, wherein the fault prediction model is per device, the method further comprising training a plurality of fault prediction models including the fault prediction model, each of the plurality of fault prediction models configured to predict a different type of fault.

13. The method of claim 8, wherein augmenting the data set with the supplemental data from the one or more of the plurality of additional devices comprises:
   clustering the plurality of additional devices in a plurality of clusters based on characteristics of the plurality of additional devices;
   associating the first device with a first cluster of the plurality of clusters; and
   extracting the supplemental data from the first cluster.

14. The method of claim 8, wherein influencing the operations of the first device using the fault prediction model comprises identifying, on an interface, that the first device is in need of maintenance and causing maintenance to be performed on the first device.

15. One or more non-transitory computer-readable media storing instructions that, when executed by one or more processors, cause the one or more processors to perform operations comprising:
   assessing whether a data set from a first device of building equipment is sufficient to train a fault prediction model for the first device;
   in response to a determination that the data set from the first device is sufficient to train the fault prediction model for the first device, training the fault prediction model for the first device using the data set from the first device;
   in response to a determination that the data set from the first device is insufficient to train the fault prediction model for the first device;
   ranking a plurality of additional devices based on similarities between the first device and the plurality of additional devices;
   augmenting the data set with supplemental data from one or more of the plurality of additional devices of building equipment to obtain an augmented data set, the supplemental data obtained from each subsequent device of the plurality of additional devices in an order based on the ranking until the augmented data set is sufficient to train the fault prediction model; and
   training the fault prediction model for the first device using the augmented data set; and
   influencing operations of the first device using the fault prediction model.

16. The one or more non-transitory computer-readable media of claim 15, the operations comprising augmenting the data set with the supplemental data from the one or more of the plurality of additional devices by increasing an amount of the supplemental data until the augmented data set is sufficient to train the fault prediction model.

17. The one or more non-transitory computer-readable media of claim 15, the operations comprising augmenting the data set with the supplemental data from the one or more of the plurality of additional devices by increasing a count of the one or more of the plurality of additional devices from which the supplemental data is used until the augmented data set is sufficient to train the fault prediction model.

18. The one or more non-transitory computer-readable media of claim 15, wherein the supplemental data is specific to a particular type of fault and the fault prediction model predicts the particular type of fault.

19. The one or more non-transitory computer-readable media of claim 15, wherein the fault prediction model is per device, the operations further comprising training a plurality of fault prediction models including the fault prediction model, each of the plurality of fault prediction models configured to predict a different type of fault.

20. The one or more non-transitory computer-readable media of claim 15, wherein augmenting the data set with the supplemental data from the one or more of the plurality of additional devices comprises:
   clustering the plurality of additional devices in a plurality of clusters based on characteristics of the plurality of additional devices;
   associating the first device with a first cluster of the plurality of clusters; and
   extracting the supplemental data from the first cluster.

* * * * *